United States Patent
Que

(10) Patent No.: US 10,880,513 B1
(45) Date of Patent: Dec. 29, 2020

(54) METHOD, APPARATUS AND SYSTEM FOR PROCESSING OBJECT-BASED VIDEO FILES

(71) Applicant: Shenzhen Baichuan Security Technology Co., Ltd., Shenzhen (CN)

(72) Inventor: Yulong Que, Shenzhen (CN)

(73) Assignee: Shenzhen Baichuan Security Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/936,438

(22) Filed: Jul. 23, 2020

(30) Foreign Application Priority Data

May 22, 2020 (CN) .......................... 2020 1 0443557

(51) Int. Cl.
| | |
|---|---|
| *H04N 5/77* | (2006.01) |
| *H04N 5/92* | (2006.01) |
| *H04N 5/265* | (2006.01) |
| *G11B 27/19* | (2006.01) |
| *G06T 7/292* | (2017.01) |
| *G11B 27/031* | (2006.01) |
| *H04N 7/18* | (2006.01) |
| *H04N 5/247* | (2006.01) |

(52) U.S. Cl.
CPC ............ *H04N 5/9205* (2013.01); *G06T 7/292* (2017.01); *G11B 27/031* (2013.01); *G11B 27/19* (2013.01); *H04N 5/247* (2013.01); *H04N 5/265* (2013.01); *H04N 7/181* (2013.01); *H04N 7/188* (2013.01)

(58) Field of Classification Search
USPC ......................................................... 386/223
See application file for complete search history.

(56) References Cited

U.S. PATENT DOCUMENTS

| | | | | |
|---|---|---|---|---|
| 9,202,356 | B1* | 12/2015 | Kobayashi | G08B 13/19686 |
| 10,430,666 | B2* | 10/2019 | Koyama | G06K 9/00362 |
| 2004/0017929 | A1* | 1/2004 | Bramblet | G07C 9/15 |
| | | | | 382/103 |
| 2010/0045800 | A1* | 2/2010 | Chebil | G03B 13/36 |
| | | | | 348/169 |
| 2011/0135148 | A1* | 6/2011 | Hsiao | G06K 9/00355 |
| | | | | 382/103 |
| 2011/0261225 | A1* | 10/2011 | Niinami | H04N 5/23218 |
| | | | | 348/223.1 |
| 2015/0125032 | A1* | 5/2015 | Yamanaka | G06K 9/00624 |
| | | | | 382/103 |
| 2016/0028939 | A1* | 1/2016 | Ogawa | H04N 5/23222 |
| | | | | 348/346 |

(Continued)

*Primary Examiner* — Nigar Chowdhury
(74) *Attorney, Agent, or Firm* — Idea Intellectual Limited; Margaret A. Burke; Sam T. Yip

(57) ABSTRACT

The present invention provides a method, an apparatus, and a system for processing object-based video files. The method is applied to a camera or a camera cluster. When the moving object enters a monitoring area of the camera or the camera cluster, the camera or the camera cluster starts to capture videos containing the moving object; color block information of the moving object according to a preset first algorithm is recorded by the camera or the camera cluster; the moving object is identified and marked according to the color block information of the moving object by the camera or the camera cluster; and a video file is generated by merging videos containing a specific moving object which are captured in a preset period of time and is uploaded to a storage space by the camera or the camera cluster.

11 Claims, 6 Drawing Sheets

(56) References Cited

U.S. PATENT DOCUMENTS

| | | | |
|---|---|---|---|
| 2016/0065820 A1* | 3/2016 | Yamamoto | H04N 5/2353 |
| | | | 348/151 |
| 2016/0092739 A1* | 3/2016 | Oami | G06T 7/292 |
| | | | 348/159 |
| 2017/0034542 A1* | 2/2017 | Yabu | G06Q 30/00 |
| 2018/0053314 A1* | 2/2018 | Tsuji | G06T 7/246 |
| 2018/0204111 A1* | 7/2018 | Zadeh | G06K 9/3233 |
| 2018/0260614 A1* | 9/2018 | Wang | G06K 9/00261 |
| 2019/0012531 A1* | 1/2019 | Radwin | G06T 7/246 |
| 2019/0046080 A1* | 2/2019 | Nishikado | A61B 5/0077 |
| 2019/0098250 A1* | 3/2019 | Osawa | G06F 16/74 |
| 2019/0130733 A1* | 5/2019 | Hodge | G06K 9/00771 |
| 2019/0132556 A1* | 5/2019 | Itoh | H04N 7/18 |
| 2019/0172217 A1* | 6/2019 | Ashraf | G06T 7/74 |
| 2019/0244386 A1* | 8/2019 | Fisher | G06Q 10/087 |
| 2019/0251571 A1* | 8/2019 | O'Reilly | G06Q 20/40145 |
| 2019/0259165 A1* | 8/2019 | Watanabe | H04N 7/185 |
| 2019/0278804 A1* | 9/2019 | Matsushita | G06K 9/00248 |
| 2019/0279495 A1* | 9/2019 | Nishioka | G08B 25/10 |
| 2019/0332856 A1* | 10/2019 | Sato | G06K 9/00335 |
| 2020/0025877 A1* | 1/2020 | Sarkis | G01S 13/87 |
| 2020/0125855 A1* | 4/2020 | Yamashita | G06K 9/00288 |
| 2020/0215329 A1* | 7/2020 | Kilgard | G09B 19/003 |

* cited by examiner

METHOD, APPARATUS AND SYSTEM FOR PROCESSING OBJECT-BASED VIDEO FILES

CROSS-REFERENCES TO RELATED APPLICATIONS

This application claims priority to the Chinese patent application No. 202010443557.8 filed on May 22, 2020, and the disclosure of which is incorporated herein by reference in its entirety.

FIELD OF THE INVENTION

This invention relates to the field of video image, in particular to a method, apparatus, and system for processing object-based video files.

BACKGROUND OF THE INVENTION

At present, most camera products in market apply image motion detection, infrared detection, or face detection in processing images to identify key objects when recording video files, and then store the video files. These video processing methods generally lack for correlation processing of the video files. Under the condition that the point of time when key objects will appear is unpredictable, users often need to check through video files of all time sessions in a camera or a camera cluster to find images of key objects; or, it could be even more difficult to find the images of key objects of interest if the key objects of interest are distributed in video files captured by different cameras at different points of time.

SUMMARY OF THE INVENTION

With respect to the issues as described in the Background of the Invention, the present invention provides a method, an apparatus, and a system for processing object-based video files.

According to a first aspect of the present invention, a method for processing object-based video files is provided and applied to a camera or a camera cluster, which includes steps as follows.

Step one: starting to capture videos containing a moving object by the camera or the camera cluster when the moving object enters a monitoring area of the camera or the camera cluster;

Step two: recording color block information of the moving object according to a preset first algorithm by the camera or the camera cluster;

Step three: identifying and marking the moving object according to the color block information of the moving object by the camera or the camera cluster; and Step four: generating a video file by merging videos containing the moving object which are captured in a preset period of time and uploading the video file to a storage space by the camera or the camera cluster.

According to a second aspect of the present invention, an apparatus for processing object-based video files is provided. The apparatus may be a camera or a camera cluster, which can execute the method for processing object-based video files according to the first aspect of the present invention.

According to a third aspect of the present invention, a system for processing object-based video files is provided, including: a camera or a camera cluster; a storage space; and a displaying device. The displaying device is configured to display, based on the selection by a user, a video file formed by merging videos containing a selected specific moving object which are captured in a preset period of time.

According to the present invention, a method, an apparatus, and a system for processing object-based video files are provided. By identifying, marking and correlation processing of moving objects, video images of a specific object can be directly displayed to a user in a continuous manner, which greatly improves checking efficiency with respect to specific video content, thereby user experience is effectively improved.

BRIEF DESCRIPTION OF THE DRAWINGS

In order to more clearly describe technical solutions of embodiments in the present invention or in the prior art, following are some brief descriptions with respect to drawings required in the description of the embodiments or in the prior art. Obviously, the drawings described below are just some embodiments of the present invention. For an ordinary person skilled in the art, other drawings may be conceived according to these drawings without creative work.

DETAILED DESCRIPTION

In order to more clearly explain purposes, technical solutions, and advantageous of embodiments of the present invention, the following descriptions will be provided clearly and completely in combination of drawings of the embodiments of the present invention. Apparently, the described embodiments are only some but not all of embodiments of the present invention. All other embodiments obtained without creative work by an ordinary person skilled in the art based on these embodiments of the present invention shall be covered by the scope of the present invention.

Figure 2:
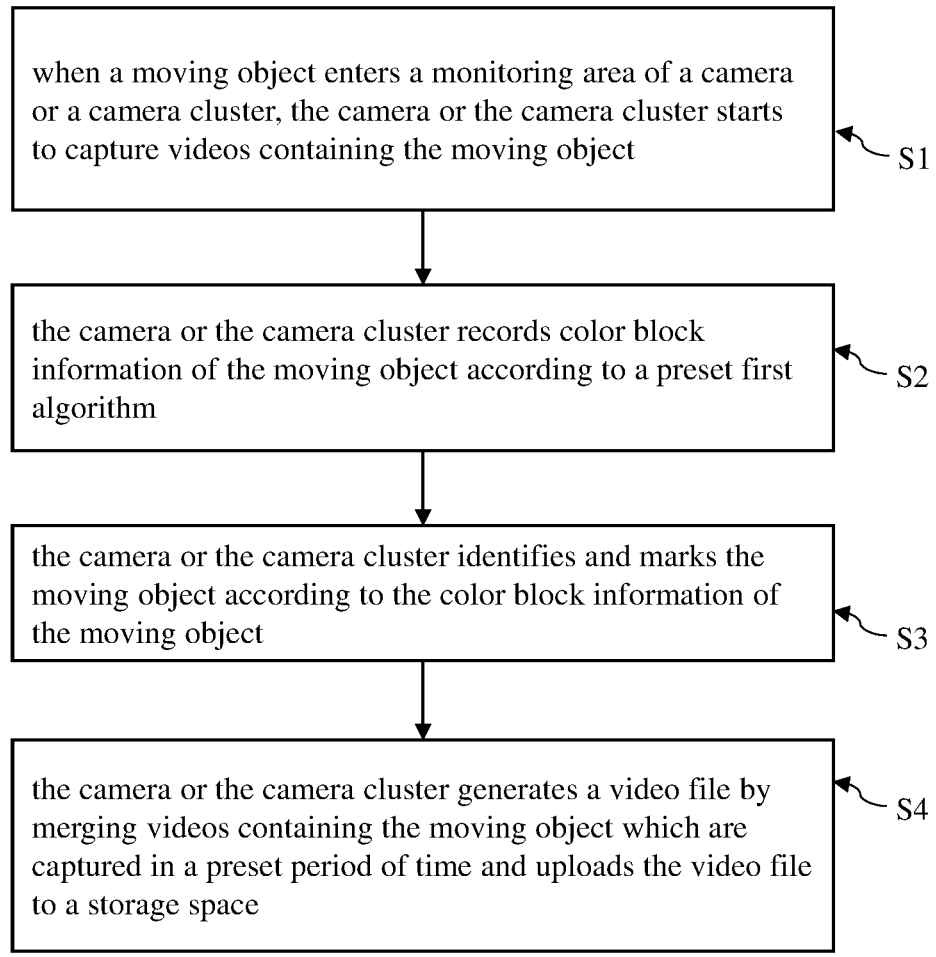
FIG. 2 is a schematic flowchart of a method for processing object-based video files according to an embodiment of the present invention.

According to an embodiment of the present invention, a method for processing object-based video files is provided and applied to a camera or a camera cluster. As shown in FIG. 2, the method includes steps as follows.

In Step S1, when a moving object enters a monitoring area of a camera or a camera cluster, the camera or the camera cluster starts to capture videos containing the moving object;

In Step S2, the camera or the camera cluster records color block information of the moving object according to a preset first algorithm;

In Step S3, the camera or the camera cluster identifies and marks the moving object according to the color block information of the moving object;

In Step S4, the camera or the camera cluster generates a video file by merging videos containing the moving object which are captured in a preset period of time and uploads the video file to a storage space.

According to an embodiment of the present invention, a method for processing object-based video files is provided. By identifying and marking and correlation processing of moving object, the video images of a specific object can be directly displayed to a user in a continuous manner, which greatly improves checking efficiency with respect to specific video content, thereby user experience can be effectively improved.

Figure 1:
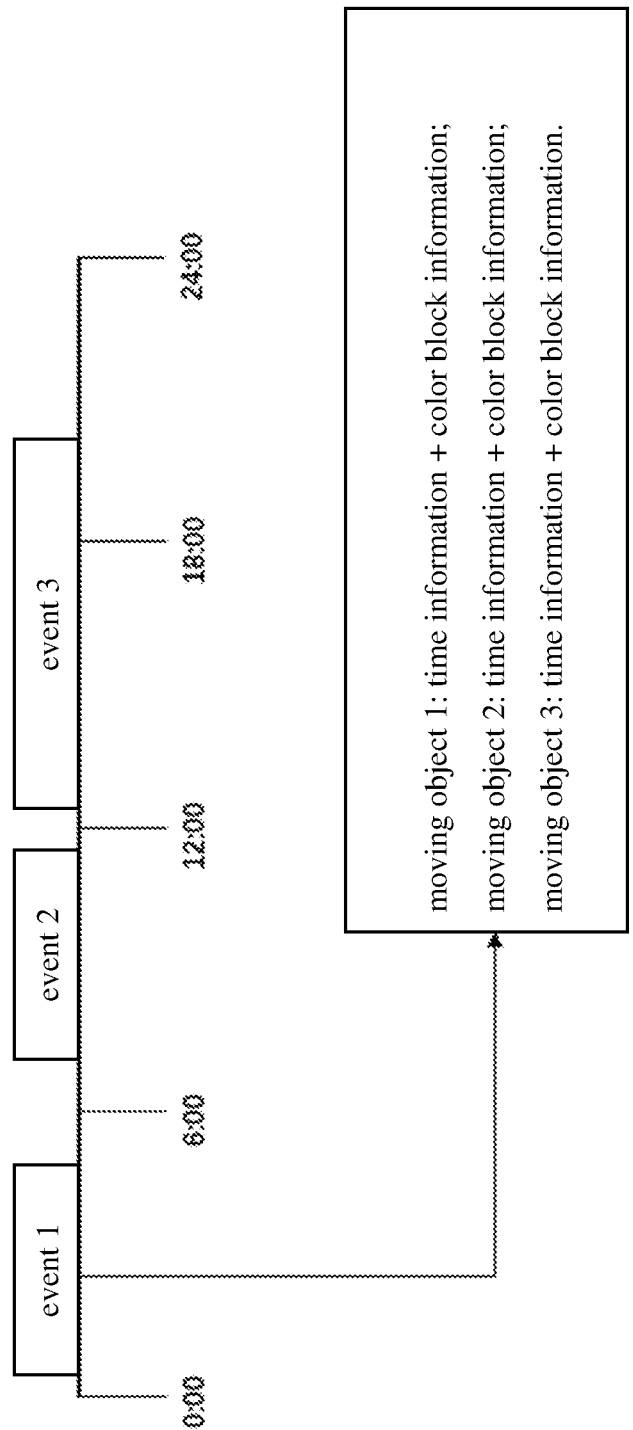
FIG. 1 is a schematic illustration of occurrence of moving objects over a time line according to an embodiment of the present invention.

As shown in FIG. 1, which is a schematic illustration of occurrence of moving objects over a time line according to an embodiment of the present invention. For general cases in the camera field, in order to reduce a standby power consumption of a camera and prolong standby time thereof, only when a moving object enters monitoring area of the camera, the camera is operated in a full power mode to capture and record images containing the moving object. As shown in FIG. 1, within a 24-hour monitoring duration, the camera records three events wherein there are three moving objects in an event 1. At the same time, the camera records time information and color block information of the three moving objects in the event 1.

Optionally, according to an embodiment of the present invention, a method for processing object-based video files is provided, in which the step of that the camera or the camera cluster records the color block information of the moving objects according to the preset first algorithm includes:

Merging pixels of image regions belonging to the moving object which have color value differences less than a first threshold value between each other into color blocks, and recording color value and area of each of the color blocks of the moving object, wherein:

the color value differences are determined to be less than the first threshold value or not by using HSV (Hue, Saturation, Value) color model, LAB color model, or CIEDE2000 color difference formula; and the color value of a color block is equal to a color value of a largest color area in the color block, and the area of a color block is equal to a total area of the pixels contained in the color block.

Although algorithms for face recognition and other image feature extraction are becoming more mature, it is an accurate and universal method to mark moving objects with color block information. Adjacent pixels in an image of a moving object with the same color value or having a color value differences less than a first threshold value are merged to a same color block, and each of the color block contains information, such as color value and color block area. A moving object may contain multiple color blocks. The color value of the color block may consist of an RGB value (e.g. #000000), and the area of the color block is equal to a total area of the pixels contained in the color block. Specifically, the color value differences can be calculated on basis of HSV color model, LAB color model, or CIEDE2000 color difference formula, and the first threshold value may be adjustable. It should be understood that the smaller the threshold value is set, the more color blocks the moving object would be cut into, which results in higher calculation accuracy but higher cost.

Herein, a determination algorithm based on LAB color model is taken as an example:
    def ColourDistance(rgb_1, rgb_2):
    R_1, G_1, B_1=rgb_1
    R_2, G_2, B_2=rgb_2
    rmean=(R_1+R_2)/2
    R=R_1−R_2
    G=G_1−G_2
    B=B_1−B_2
    Return
math.sqrn(2+rmean/256)*(R**2)+4*(G**2)±(2±(255−rmean)/256)*(B**2))

Herein, if the calculated color value difference between two pixels is less than a preset first threshold value, the two pixels are merged into the same color block.

Figure 3:
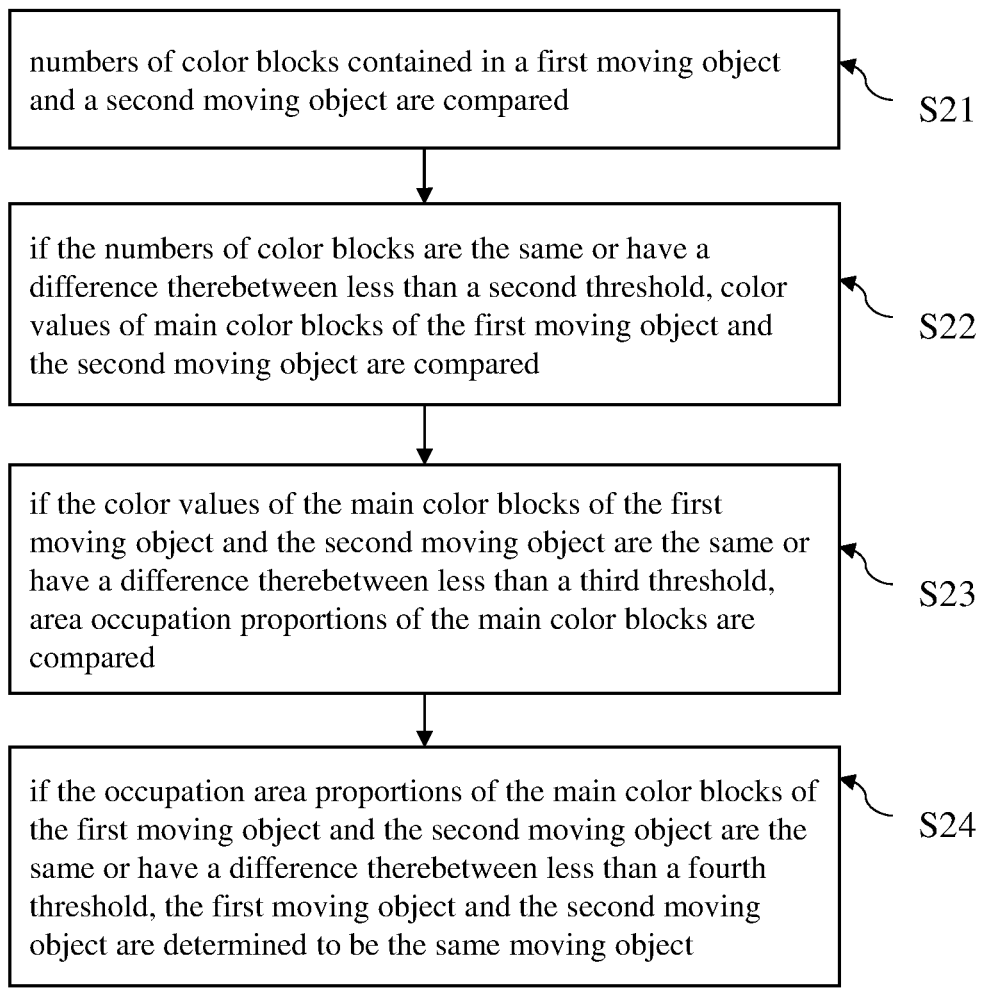
FIG. 3 is a schematic flowchart of a method for identifying and marking moving object according to an embodiment of the present invention.

Optionally, according to an embodiment of the present invention, a method for processing object-based video files is provided, as shown in FIG. 3, in which the step of that the camera or the camera cluster identifies and marks the moving object according to the color block information of the moving object includes:

In Step S21, numbers of color blocks contained in a first moving object and a second moving object are compared;

In Step S22, if the numbers of color blocks are the same or have a difference therebetween less than a second threshold, color values of main color blocks of the first moving object and the second moving object are compared;

In Step S23, if the color values of the main color blocks of the first moving object and the second moving object are the same or have a difference therebetween less than a third threshold, area occupation proportions of the main color blocks are compared;

In Step S24, if the occupation area proportions of the main color blocks of the first moving object and the second moving object are the same or have a difference therebetween less than a fourth threshold, the first moving object and the second moving object are determined to be the same moving object.

After the camera or the camera cluster performs the process of division of the moving object into the color blocks, the moving object can be quickly and effectively identified and marked by comparing the color block information of the moving objects. According to the identifying and marking process as shown in FIG. 3, a variety of similar identifying and marking methods can be derived. At present, according to experiments, the numbers of color blocks of two moving objects are compared first; if the numbers of the color blocks of both are the same or similar, or having a difference less than a second threshold (it should be understood that the second threshold is also adjustable), a next step of determination would be performed, which includes comparing color values of main color blocks in the two moving objects; if the color values of the main color blocks are the same or similar, or having a difference less than a third threshold (it should be understood that the third threshold is also adjustable), a next step of determination would be performed, which includes comparing area occupation proportions of the main color blocks in the two moving objects; if the area occupation proportions of the main color blocks are the same or similar, or having a difference less than a fourth threshold (it should be understood that the third threshold is also adjustable), the two moving objects are determined to be the same moving object.

Figure 4:
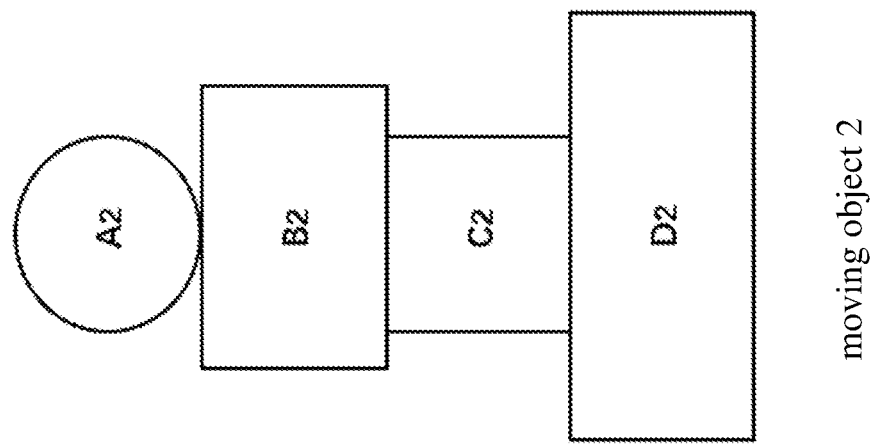
FIG. 4 is a schematic illustration of area occupation proportions of main color blocks according to an embodiment of the present invention.
Figure 4:
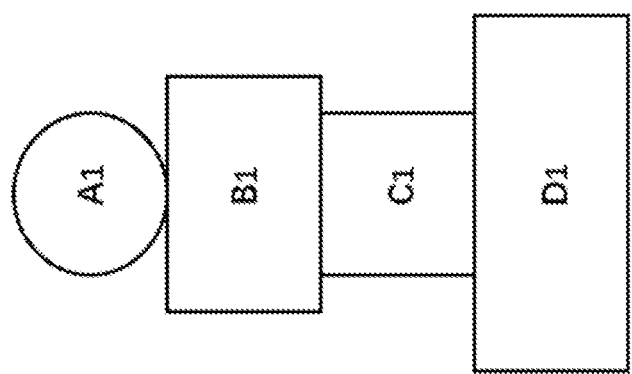

For better understanding, it is provided in FIG. 4 a schematic illustration of area occupation proportions of main color blocks according to an embodiment of the present invention. Under a relative ideal situation, moving object 1 contains four color blocks, labeled as A1, B1, C1, and D1, and moving object 2 contains four color blocks, labeled as A2, B2, C2, and D2. The numbers of color blocks of the both are the same, and color values of main color blocks of the both are the same or similar, and thus area occupation proportions of the color blocks are compared; wherein, if area proportion of the color block A1 occupying the moving object 1 is the same as area proportion of the color block A2 occupying the moving object 2, area proportion of the color block B1 occupying the moving object 1 is the same as area proportion of the color block B2 occupying the moving object 2, area proportion of the color block C1 occupying the moving object 1 is the same as area proportion of the color block C2 occupying the moving object 2, and area proportion of the color block D1 occupying the moving object 1 is the same as area proportion of the color block D2 occupying the moving object 2, then the moving object 1 and moving object 2 are determined to be the same moving object.

Optionally, according to an embodiment of the present invention, a method for processing object-based video files is provided, in which main color blocks of a first moving object and a second moving object include:

Color blocks having a total occupation area that occupy more than 75% of the total occupation area of color blocks of a moving object; or Color blocks having a total number that occupy more than 75% of total number of color blocks of a moving object.

Herein, it should be understood that the comparing of the color values or the occupation area proportions for all the color blocks of each moving object is a very tedious computation. Therefore, a main color block in each moving object can be selected for calculation. For example, a large batch of color blocks with a total occupation area proportion more than 75% are selected as a main color block; or a large batch of color blocks with a total number proportion more than 75% are selected as a main color block.

Optionally, according to an embodiment of the present invention, a method for processing object-based video files is provided, in which the method further comprises the following steps.

If images of a moving object are captured with a plurality of cameras in a camera cluster in a preset period of time, after the plurality of cameras generate a plurality of merged video files containing the moving object and upload them to a storage space, the storage space would further merge the plurality of merged video files into a single video file according to time sequence in which the moving object appears.

Herein, what is considered is that there is a set of cameras in a family, and a moving object may appear in monitoring areas of a plurality of different cameras within a fixed period of time. For example, during a day, a pet kept by a user may appear in different rooms and at different doors of a house which are a plurality of regions to be monitored. At this time, if an overall video file is desired to be generated from the video images of the pet according to time sequence, it is necessary to use a storage space to proceed a further video merging.

According to an embodiment of the present invention, an apparatus for processing object-based video files is provided, in which the apparatus includes a camera or a camera cluster, which can execute the method for processing object-based video files provided by the embodiments of the present invention as afore-described.

Optionally, according to an embodiment of the present invention, an apparatus for processing object-based video files is provided, in which the apparatus further includes a storage space. The storage space is a storage device in a network video recorder or a cloud server.

If a moving object appears in images recorded with a plurality of cameras in a camera cluster in a preset period of time, after the plurality of cameras generate a plurality of merged video files formed by merging videos containing the moving object and upload the plurality of merged video files to a storage space respectively, the storage space would further merge the plurality of merged video files into a single video file according to time sequence in which the moving object appears.

According to an embodiment of the present invention, a system for processing object-based video files is provided and includes: a camera or a camera cluster, a storage space, and a displaying device. Based on user selection, the displaying device is configured to display a video file formed by merging videos containing a specific moving object which are captured in a preset period of time.

Optionally, according to an embodiment of the present invention, a system for processing object-based video files is provided, in which a displaying device of the system includes:

A network video recorder; or

A smart mobile terminal

Figure 5:
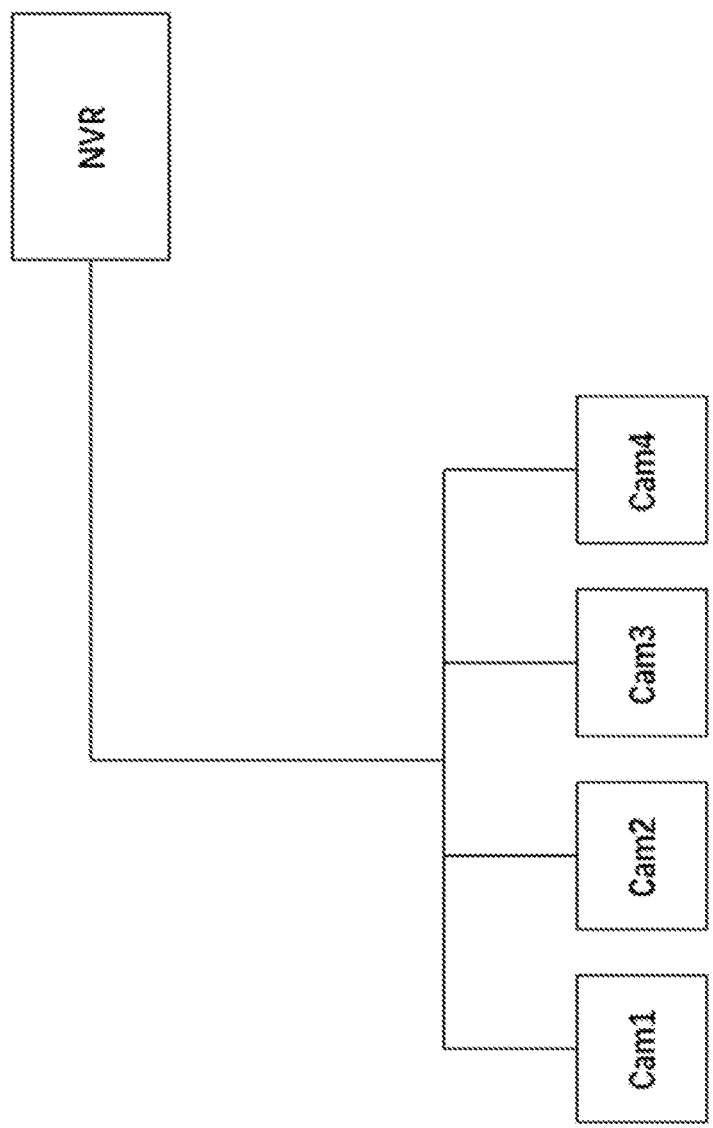
FIG. 5 is a schematic diagram of a system for processing object-based video files according to an embodiment of the present invention.
Figure 6:
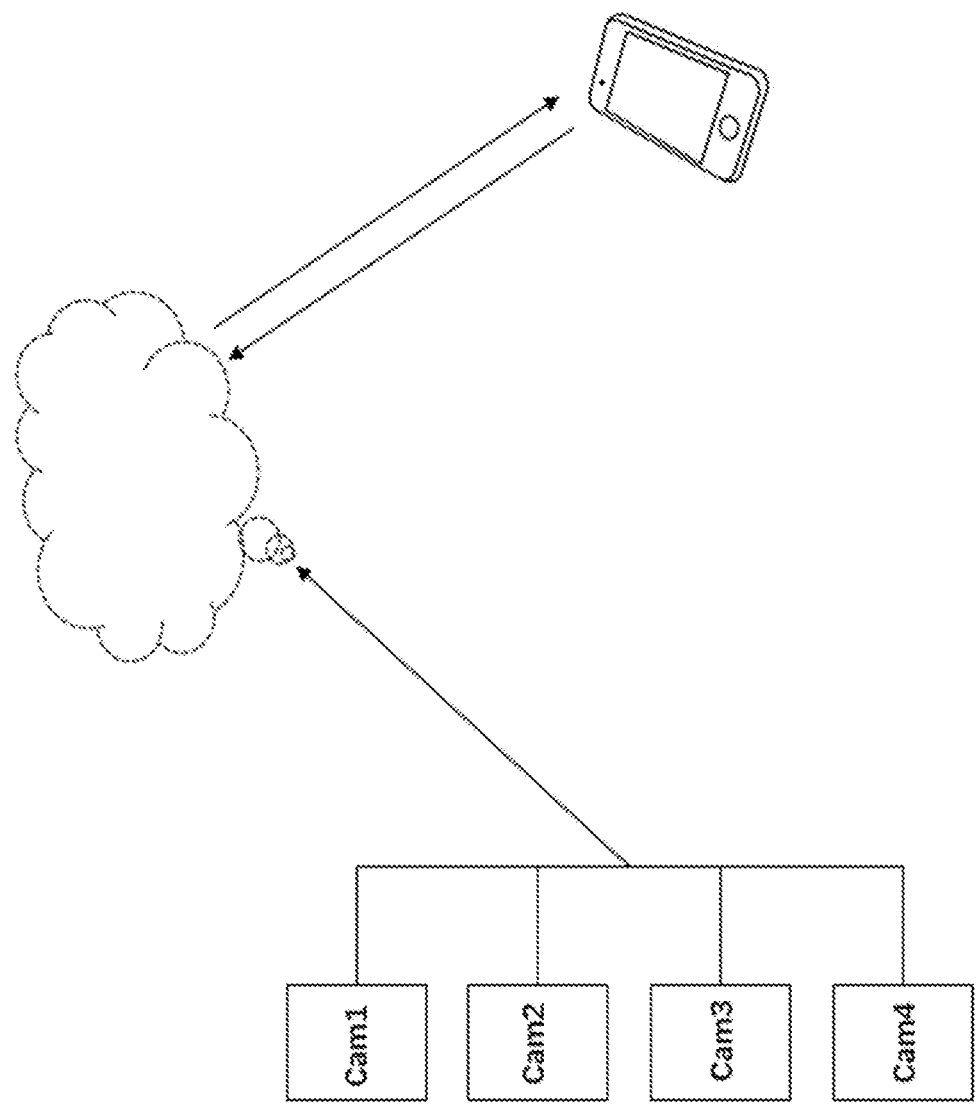
FIG. 6 is a schematic diagram of a system for processing object-based video files according to another embodiment of the present invention.

FIG. 5 and FIG. 6 schematically illustrate two mainstream systems for processing object-based video files, respectively. As shown in FIG. 5, a user installs four cameras (i.e. Cam1, Cam2, Cam3, and Cam4) in his home or other premises. The four cameras are connected to a home network video recorder (NVR) through a wired or wireless connection. The cameras generate single video files formed by merging videos recorded for each of the moving objects and then transmit the single video files to a hard disk of the NVR for storage. When the user uses the NVR for watching video files, the NVR can allow the user to directly select a moving object needed to be paid attention and watch the single video file of the selected moving object. As shown in FIG. 6, four cameras (i.e. Cam1, Cam2, Cam3, and Cam4) are connected to a cloud server through a wireless network. The cameras generate a video file by merging videos recorded for each of the moving object and then transmit the single video files to the cloud server for storage. The user can access the cloud server through a smart mobile terminal and directly select a moving object needed to be paid attention and then watch the single video file of the selected moving object.

Although many terms such as color blocks, color values, thresholds, first, second, third, fourth are used in the present disclosure, the possibility of using other terms is not excluded. The reason for using these terms is just for describing and explaining the essence of the present invention more conveniently; and hence it is contrary to the spirit of the present invention to interpret them as any additional limitation.

Finally, it should be noted that: the above embodiments are only for illustrating the technical solutions of the present invention but not for limiting the same; although the present invention has been described in details with reference to the afore-described embodiments, those skilled in the art should understand that they can still modify the technical solutions recited in the afore-described embodiments, or equivalently substitute some or all of the technical features; and these modifications or substitutions do not make the essence of the corresponding technical solutions depart from the scope of the technical solutions of each of the embodiments of the present invention.

What is claimed is:

1. A method for processing object-based video files applied to a camera or a camera cluster, the method comprising:

starting to capture videos containing a moving object by the camera or the camera cluster when the moving object enters a monitoring area of the camera or the camera cluster;

recording color block information of the moving object according to a preset first algorithm by the camera or the camera cluster;

identifying and marking the moving object according to the color block information of the moving object by the camera or the camera cluster; and generating a video file by merging videos containing the moving object which are captured in a preset period of time and uploading the video file to a storage space by the camera or the camera cluster;

wherein the identifying and marking of the moving object according to the color block information of the moving object by the camera or the camera cluster comprises:

comparing numbers of color blocks contained in a first moving object and a second moving object;

comparing color values of main color blocks of the first and second moving objects if the numbers of the color blocks of the first and second moving object are the same or having a difference less than a second threshold;

comparing area occupation proportions of the main color blocks of the first and second moving objects if the color values of the main color blocks of the first and second moving objects are the same or having a difference less than a third threshold; and determining the first and second moving objects to be the same blocks of the first and second moving objects are the Sane or having a difference less than a fourth threshold.

2. The method of claim 1, wherein the recording of color block information of the moving object according to the preset first algorithm by the camera or the camera cluster comprises:

merging pixels of image regions belonging to the moving object which have color value differences less than a first threshold value between each other into color blocks; and recording color value and area of each of the color blocks of the moving object;

wherein the color value differences are determined to be less than the first threshold value or not by using HSV (Hue, Saturation, Value) color model, LAB color model, or CIEDE2000 color difference formula; and wherein the color value of a color block is equal to a color value of a largest color area in the color block, and the area of a color block is equal to a total area of the pixels contained in the color block.

3. The method of claim 1, wherein the main color blocks of the first moving object and the second moving object include:

color blocks having a total occupation area that occupy more than 75% of the total occupation area of color blocks of a moving object; or color blocks having a total number that occupy more than 75% of total number of color blocks of a moving object.

4. The method for processing object-based video files of claim 1, further comprising:

generating, by a plurality of cameras, a plurality of merged video files containing the moving object and upload them to the storage space if images of a moving object are captured in a preset period of time by the plurality of cameras; and merging, by the storage space, the plurality of merged video files into a single video file according to time sequence in which the moving object appears.

5. An apparatus for processing object-based video files, comprising a camera or camera cluster and a storage space, wherein the camera or camera cluster is configured to:

start to capture videos containing a moving object when the moving object enters a monitoring area of the one or more cameras;

record color block information of the moving object according to a preset first algorithm;

identify and mark the moving object according to the color block information of the moving object by:

comparing number of color blocks contained in a first moving object and a second moving object;

comparing color values of main color blocks of the first and second moving objects if the numbers of the color blocks of the first and second moving object are the same or having a difference less than a second threshold;

comparing area occupation proportions the main color blocks of the first and second moving objects if the color values of the main color blocks of the first and second moving objects are the same or having a difference less than a third threshold; and determining the first and second moving objects to be the same moving object if the occupation area proportions of the main color blocks of the first and second moving objects are the same or having a difference less than a fourth threshold; and generate a video file by merging videos containing the moving object which are captured in a preset period of time and upload the video file to the storage space.

6. The apparatus of claim 5, wherein the camera or camera cluster is further configured to merge pixels of image regions belonging to the moving object which have color value differences less than a first threshold value between each other into color blocks, and record color value and area of each of the color blocks of the moving object;

wherein the color value differences are determined to be less than the first threshold value or not by using HSV (Hue, Saturation, Value) color model, LAB color model, or CIEDE2000 color difference formula; and wherein the color value of a color block is equal to a color value of a largest color area in the color block, and the area of a color block is equal to a total area of the pixels contained in the color block.

7. The apparatus of claim 5, wherein the main color blocks of the first moving object and the second moving object include:

color blocks having a total occupation area that occupy more than 75% of the total occupation area of color blocks of a moving object; or color blocks having a total number that occupy more than 75% of total number of color blocks of a moving object.

8. The apparatus of claim 5 wherein the camera or camera cluster is further configured to generate a plurality of merged video files containing the moving object and upload them to the storage space if images of a moving object are captured in a preset period of time with more than one camera; and the storage space is configured to merge the plurality of merged video files into a single video file according to time sequence in which the moving object appears.

9. The apparatus of claim 5, wherein the storage space is a storage device in a network video recorder or a cloud server.

10. The apparatus of claim 5, further comprising a displaying device configured to display, based on a user selection of a specific moving object, a video file formed by merging videos containing one or more selected specific moving objects which are captured in a preset period of time.

11. The apparatus of claim 10, wherein the display device includes a network video recorder or a smart mobile terminal.

* * * * *